(No Model.)
W. PRICE.
PROCESS OF MAKING WROUGHT IRON.
No. 323,365. Patented July 28, 1885.
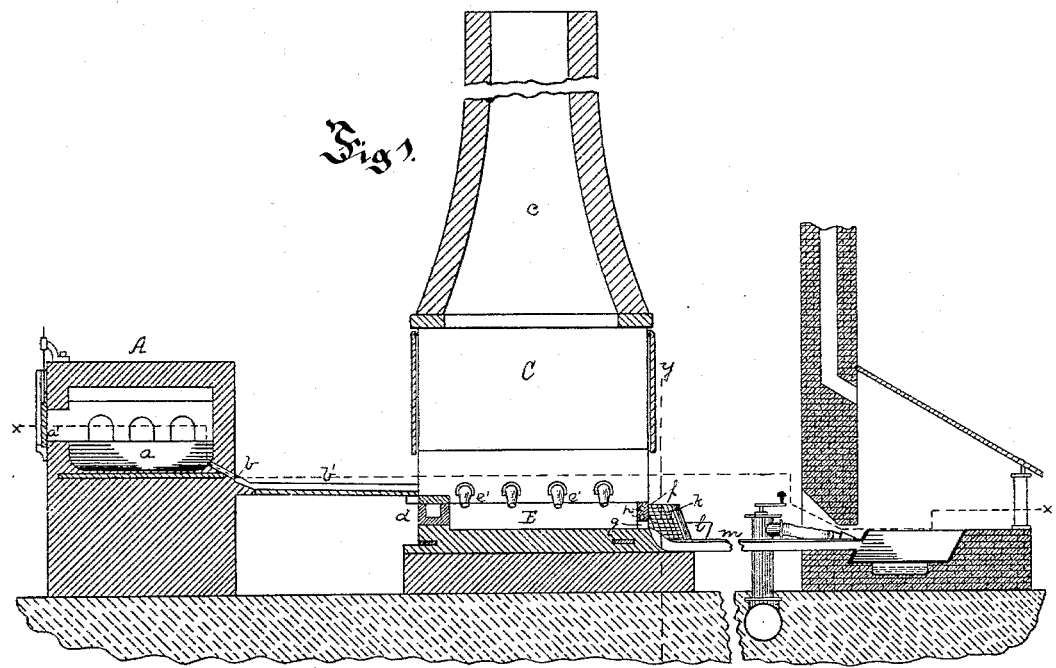
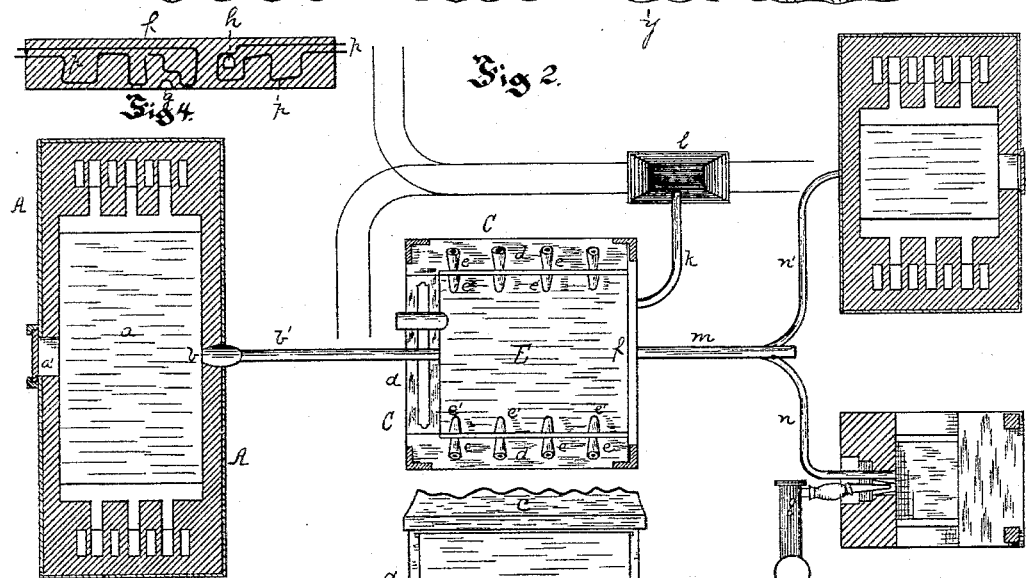
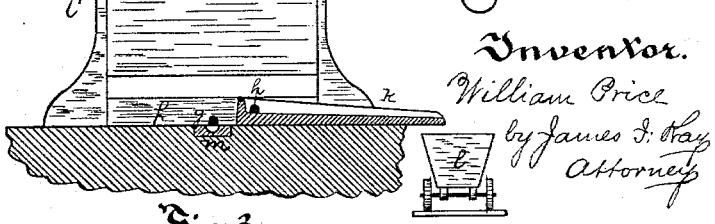
Witnesses.
Tony Bock
Jn Cooke
Inventor.
William Price
by James T. Kay
Attorney

UNITED STATES PATENT OFFICE.

WILLIAM PRICE, OF McKEESPORT, PENNSYLVANIA.

PROCESS OF MAKING WROUGHT-IRON.

SPECIFICATION forming part of Letters Patent No. 323,365, dated July 28, 1885.

Application filed November 26, 1883. (No model.)

*To all whom it may concern:*

Be it known that I, WILLIAM PRICE, of McKeesport, in the county of Allegheny and State of Pennsylvania, have invented a new and useful Improvement in Processes of Making Wrought-Iron; and I do hereby declare the following to be a full, clear, and exact description thereof.

My invention relates to the treatment of pig metal in the reduction from the crude pig to blooms, from which the finished wrought metal is formed; and the invention relates especially to the treatment of metal in the refinery-furnace preparatory to the treatment by puddling or in the knobbling-fire or forge.

Heretofore, in refining the crude metal, or "pig metal," as it is usually termed, it was generally placed in the refinery-furnace and melted by means of heat generated by the blast and coke, and treated by means of cinder, to cause the thorough refining of the metal. It was then run out in the casting-bed and rapidly cooled, the cinder and refined metal being run out together, and after the cooling of the charge the cinder being broken and separated from the top of the metal, which, on account of its gravity, sank below the cinder, and was thus easily separated therefrom. In some cases the pig metal was melted in a suitable blast-furnace and run into the refinery-furnace in a fluid state, to be afterward treated in the same manner as the metal melted in the refinery-furnace, and the cinder and refined metal, while in a molten fluid state, have also been tapped separately and the metal run into a puddling-furnace; but in this case the operation of the refinery-furnace was delayed, the molten pig metal chilled, and the expense of operation increased by the introduction and melting of the cold cinder fed thereto for the treatment of the next charge.

The object of my invention is to so improve the treatment of the crude metal in the refinery-furnace as to expedite its operations and lessen the cost thereof; and it consists, essentially, in treating the charge of pig metal and cinder in the refinery-furnace, and after coming to nature, when in a molten condition, tapping off the cinder, conducting the molten refined metal to the furnace or forge for further treatment, and then introducing the molten cinder so removed and molten crude metal into the refinery-furnace for the next charge, the time and cost of melting the cinder and crude metal in the refinery being thus saved, and the operation of the refinery being greatly expedited.

To enable others skilled in the art to carry on my invention, I will describe the same more fully, referring to the accompanying drawings, in which—

Figure 1 is a longitudinal section illustrating the melting-furnace and refinery-furnace and a forge or knobbling-furnace suitable for carrying out my invention. Fig. 2 is a horizontal section on the line *x x* of the melting-furnace, refinery-furnace, one forge-fire, and two puddling-furnaces suitable for carrying on my invention. Fig. 3 is a vertical section on the line *y y*, Fig. 1, and Fig. 4 is a longitudinal section of the same plate.

As shown in the drawings, in carrying out my invention, in order to facilitate the process, I employ a suitable melting-furnace, A. This melting-furnace may either be a blast-furnace or reverberatory furnace suitable for the purpose, the one illustrated in the drawings being an ordinary gas-furnace of size sufficient to melt the required charge. It is provided with the gas and air ports at each end, with the bed *a*, door *a'*, and on the side opposite the door the tap-hole *b*, leading into the trough *b'*, by means of which the melted metal in the furnace is conducted to the refinery-furnace C. This furnace is usually of the ordinary construction, except in the particulars hereinafter described, having the chimney *c*, the water-blocks *d* around three sides thereof, the tuyere-plates *d'*, and the tuyeres or blast-pipes *e* on each side, the ends of the blast pipes being protected by suitable water-tuyeres, *e'*, and the blast of air being thus directed down on the hearth E of the furnace.

The number of blast-pipes employed in the furnace varies according to the capacity of the refinery, those preferred by me having about four blast-pipes on each side.

At the front of the furnace is the dam-plate *f*, this dam-plate being provided with the tap-hole *g* in the base thereof, by means of which the entire charge of refined metal is withdrawn from the hearth, and with the supplemental tap-hole *h*, which is placed to one side of the tap-hole *g* and higher up in the plate. This upper tap-hole, h, leads to the trough k, which communicates at its end with a suitable cinder-receptacle, that preferred by me being a buggy, l, into which the cinder tapped from the refinery is directed, so that as soon as the refined metal is removed from the refinery this melted cinder may be again introduced on the hearth of the refinery from the buggy, and thus save the time necessary to melt the cinder before the next charge of crude melted pig is introduced or run into the refinery.

The tap-hole g, instead of communicating with the casting-bed, as in the ordinary refinery, communicates with a suitable trough, m, which leads directly or by branch troughs n n′ either to the puddling-furnace or knobbling-fires, according to subsequent treatment to which the metal is to be subjected.

The dam-plate is provided with suitable water-pipes, p, circulating through it, in order to prevent its rapid burning out, the pipes being arranged to run close to or around the tapping-holes of the dam-plate, so that they may be thus prevented from burning out during the tapping of the cinder or refined metal, or by the heat of the refinery-fire.

The plate may be made in the form of a hollow water-box; but under the intense heat and the changes of temperature in tapping through the plate it is found liable to crack or break, and the difficulties are overcome by the employment of these water-pipes.

The refinery is provided with suitable doors or shields to hold the heat therein and protect the workmen operating the furnace.

The construction of the forge or knobbling fire employed is the same as the ordinary forge now in use, except that means are provided for conducting the molten refined metal to the hearth, as is also the case with the puddling-furnaces, and these need not be further described.

In carrying on my invention the metal is first melted in the blast or reverberatory furnace, and before commencing the heat a certain portion of the cinder and coke is placed in the hearth of the refinery and melted under the blast, the proportion of cinder employed being about thirty-five pounds to one hundred pounds of crude metal. The molten crude metal is then conducted through the trough b′ to the refinery and a suitable amount of coke fed thereto, and the melted metal is then subjected to the action of the blast and heated cinder, all the impurities usually removed by this process being taken up by the cinder or carried off by the flame, and the metal being thoroughly refined. As in the usual process in the refinery, the treatment of the metal thus run in requires generally about one-half hour, and as soon as the metal comes to nature, on checking the blast slightly, the cinder floats to the surface thereof, and the operator taps the cinder from the surface of the refined metal through the tap-hole h, conducting it through the trough k into the buggy or other receptacle, and carefully watching the running of the cinder to prevent loss of metal. He then taps the refined metal thus separated from the cinder through the tap-hole g, and by means of the trough m and side troughs, n n′, leads the molten metal either into the forge or knobbling fire or to the puddling-furnaces, as desired. During the treatment of the metal in the refinery another charge has been melted in the furnace A, and the molten cinder thus removed, or a proper portion thereof, according to the circumstances, is then run from the buggy into the hearth of the furnace, and the crude metal tapped from the furnace A into the refinery, and the operation of refining continued, as above described, so that the process may be continued from the melting-furnace to the refinery, and thence to the forge or puddling-furnaces without the cooling of the metal. By introducing this molten cinder into the refinery-furnace for the next charge the refining of this charge may be proceeded with without waiting for the melting of the cinder—a difficulty always experienced in running the crude metal into the refinery. The cinder obtained in this manner may be employed from two to three times, and greatly expedites the operation of refining and saves a large amount of fuel.

By means of my invention I am enabled, on account of the employment of molten cinder, to expedite the treatment of crude metal run into the refinery, so that one charge may be treated in the refinery on an average every one-half or three-quarters of an hour, instead of every hour and a half or two hours, as was heretofore done.

Before my invention forges for the manufacture of bars have been arranged with a hearth having no tap-hole, the pig metal being worked in the hearth under a bath of cinder to protect it, the metal being balled and worked under the cinder and then removed for forging, and the cinder remaining in the hearth being employed with the next charge. This process differs entirely from my process, and the hearth described could be employed in carrying it out, as instead of merely melting and balling the metal it is submitted to a very high heat to purify and refine it while in a molten condition, and instead of the cinder remaining in the hearth the entire charge is necessarily run off from the hearth to separate the cinder and the refined and purified metal while in a molten condition, and the molten cinder so run off is reintroduced with the next charge to be refined.

In the manufacture of steel, slag from previous meltings in a reverberatory furnace has also been introduced into the furnace; but, so far as I am aware, no slag has been tapped from a furnace or hearth while in a molten condition before cooling, reintroduced for the treatment of the next charge.

What I claim as my invention, and desire to secure by Letters Patent, is—

The process of refining iron and utilizing the heat of molten slag, which consists in subjecting a charge of molten pig metal, coke, and cinder to the action of an air-blast, tapping off the molten refined iron and the cinder, and subsequently introducing the molten cinder and a fresh charge of crude metal, and continuing the refining process, as described.

In testimony whereof I, the said WILLIAM PRICE, have hereunto set my hand.

WILLIAM PRICE.

Witnesses:
 JAMES I. KAY,
 J. N. COOKE.